United States Patent [19]
Winchcombe et al.

[11] 3,708,362
[45] Jan. 2, 1973

[54] TREATMENT OF PLASTICS MATERIALS

[75] Inventors: John J. Winchcombe; John P. G. Windsor; Ian Biggs, all of Erdington, Birmingham 24, England

[73] Assignee: Dunlop Holding Limited, Birmingham, England

[22] Filed: June 28, 1968

[21] Appl. No.: 741,051

[30] Foreign Application Priority Data

July 6, 1967 Great Britain.....................31,241/67

[52] U.S. Cl. ....................156/82, 156/180, 156/181, 156/296, 156/306, 264/80, 264/84
[51] Int. Cl..........................B32b 31/20, B32b 31/26
[58] Field of Search..........156/60, 82, 180, 181, 306, 156/296; 264/80, 84

[56] References Cited

UNITED STATES PATENTS 3,416,411  12/1968  Hittenberger et al.
3,468,096  9/1969  Franz......................................156/82

Primary Examiner—Benjamin R. Padgett
Attorney—Stevens, Davis, Miller & Mosher

[57] ABSTRACT

The invention provides an improved method and apparatus for the reticulation of cellular material such as polyurethane foam, by means of which a continuous sheet of foam can be reticulated in a continuous fashion. The sheet is held between platens, the air in the cells of the sheet is replaced by a combustible gaseous medium which is then ignited resulting in reticulation of the foam. The sheet can then be advanced through the platens and an adjacent unreticulated portion then subjected to a repetition of the method.

The method and apparatus can also be used in a similar way for bonding together into a coherent fibrous body a mass of strands of thermoplastic material such as polypropylene fibers.

13 Claims, 5 Drawing Figures

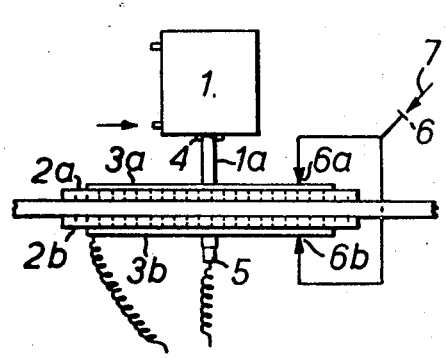
FIG. I
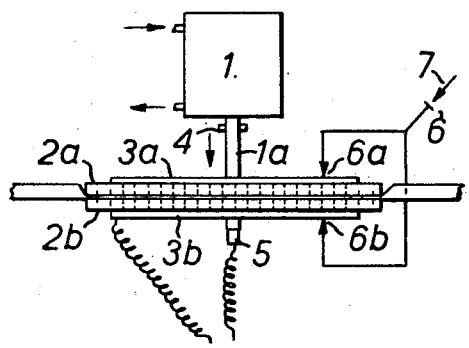
FIG. II
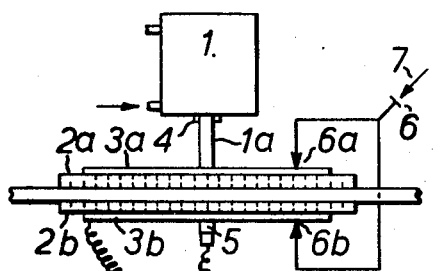
FIG. III
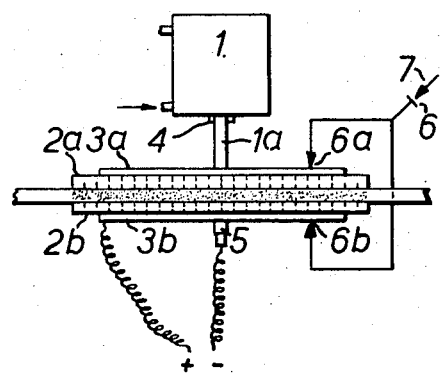
FIG. IV
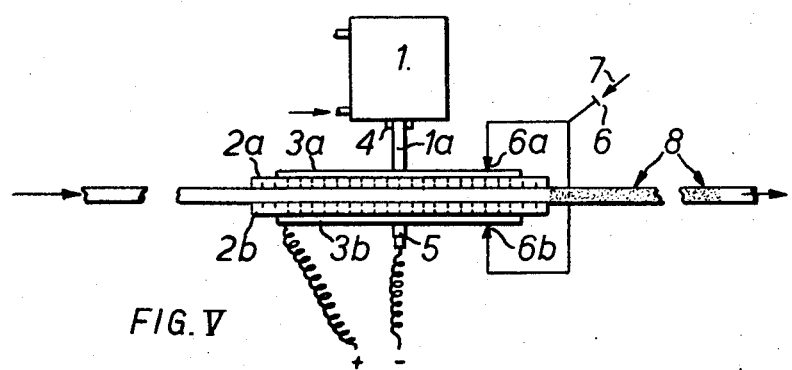
FIG. V

TREATMENT OF PLASTICS MATERIALS

This invention relates to a method and apparatus for reticulating a cellular thermoplastic material or bonding into a coherent fibrous body a mass of strands of a thermoplastic material.

Cellular thermoplastic materials such as polyurethane foam generally have a three-dimensional structure of communicating cells but the cells are not open in all directions, a large proportion of them being separated from their neighbors by intervening walls or membranes. The removal of these walls or membranes is known as reticulation. U.K. specification No. 1,063,462 to Chemotronics Inc. discloses a method for the reticulation of cellular materials, in which the foam is impregnated with a combustible gaseous medium which is then ignited resulting in removal of the cell membranes.

We have now devised a method and apparatus which enables reticulation to be carried out in a continuous fashion along the length of a sheet of cellular thermoplastics material; when the areas of reticulation are immediately adjacent to one another, the sheet is reticulated along its entire length. The method and apparatus can also be used to bond together into a coherent fibrous body a sheet of a mass of thermoplastic strands. The production of coherent fibrous bodies of this nature is the subject of our co-pending United Kingdom application No. 1434/67.

Accordingly, the present invention provides a method of reticulating a sheet of cellular thermoplastic material or of bonding together a sheet of a mass of strands of thermoplastic material into a coherent fibrous body, in which part of the sheet is constrained between two platens; the cells of the sheet in said part are filled with a combustible gaseous medium: and the gas is ignited to generate sufficient heat to reticulate the cellular material or fuse together the strands at their points of contact, as the case may be.

The method is particularly useful in respect of a continuous length of the sheet material, whereby after one portion of the sheet has been treated the sheet is advanced so that an adjacent untreated portion of the sheet comes between the platens and the steps of the method are repeated. By successive indexing forward of the sheet length any length can be treated. If desired only certain chosen portions of the sheet can be treated by allowing only those portions to be subjected to the steps of the method.

Where the method is applied to a sheet comprising a mass of strands of thermoplastic material, the strands of thermoplastic material, can be, for example, of a polyolefin, polyamide, polyester or poly(vinyl chloride). Examples of suitable materials are polypropylene, nylon (such as nylon 6 or nylon 66) and poly (ethylene terephthalate). The sheet (which need not be a supporting sheet) can be in the form of a nonwoven assembly of strands or in the form of a woven or knitted fabric. By the term "strand" as used in this Specification. there is meant a filament, staple fiber, fiber, yarn or cord. The term "strands of thermoplastic material," includes strands wholly of thermoplastic material and strands of another material, for instance rayon, having a coating of a thermoplastic material. The strands conveniently consist of staple fibers having a length of, for example, up to 2 inches, especially a length of one-fourth to 1½ inches. It is very desirable that there should be no large voids in the mass because such voids can result in local hot-spots and produce complete melting of the thermoplastic material. The presence of large voids can also result in local high pressure which may distort the material. It is preferred that the mass of strands should be of a uniform density. Typical densities are those in the range 0.002 to 0.1 g/cc.

Although the method of the invention can be satisfactorily applied to the bonding together of strands of thermoplastic material, it is of particular value in reticulating cellular thermoplastics material, and the description which follows relates particularly to the reticulating of flexible polyurethane foam, which can be of the polyether or polyester type.

The cells of the sheet can be filled with the combustible gaseous medium. for example, by any of the following procedures. (a) The sheet can be compressed between the platens to expel substantially all of the air and then as the sheet is allowed to expand the combustible gaseous medium is introduced, for instance by way of a series of apertures in one or both of the platens; (b) a modification of (a) in which only part of the air is expelled and a gaseous fuel is introduced which on mixing with the air remaining in the cells forms the desired combustible gaseous medium in situ; (c) the combustible gaseous medium is introduced in a central zone of the part of the sheet between the platens, for example by way of an inlet in the central zone of one or both platens, and is allowed to spread through said part, thereby displacing the air outwardly to the edges of the sheet. In using procedure (c) the sheet is preferably slightly compressed between the platens while the combustible gaseous medium is introduced the compression being preferably just sufficient to prevent the gas escaping without passing through the sheet.

The method, especially using procedure (a) or (b), could be modified by the use of vacuum (and advisably appropriate sealing means) to at least assist in removal of air from the sheet thereby facilitating an increase in speed of operation of the method.

The invention also provides apparatus with which the method of the invention can be carried out. The apparatus comprises two opposed platens arranged for movement respectively towards and away from each other, at least one of the platens having means for the supply of a combustible gaseous medium to the operative face of the platen so that when a sheet of cellular thermoplastic material or of a mass of thermoplastic strands is interposed in a snug fit between the platens the sheet can be permeated by the combustible gaseous medium, and means to ignite the combustible gaseous medium.

The combustible gaseous medium is preferably ignited by at least one electrical spark-plug in one of the platens. The platens, either or both of which can be movable, are usually operated by a compressed air cylinder.

The combustible gas mixture may be any which will reticulate the cellular material satisfactorily, is easily ignitable, and will not itself damage the reticulated cellular material or form products which will damage it. The preferred mixture is one of hydrogen and oxygen.

The invention is illustrated with reference to the accompanying drawings in which FIGS. I to V illustrate various stages of the method as applied to reticulation of flexible polyurethane foam.

The apparatus shown in diagrammatic form in FIG. I has a compressed air cylinder 1 (3 inches in diameter bore) fed from a 100 psi compressed air supply to move the double-acting piston 1a. Two Dural platens 2a and 2b are perforated with one-sixteenth inch holes (14 holes/sq. inch), and carry two dished metal plates 3a and 3b sealed along their periphery respectively to 2a and 2b to provide shallow gas reservoirs, having gas inlets 3c, 3d. The upper platen 2a and its associated back plate 3a can be moved vertically up and down by actuation of the piston 1a, with respect to the other platen and back plate which are fixed. The stop 4 on the piston is preset so that when the platens are in the open position and the stop bears against the cylinder 1 the foam sheet to be reticulated will just slide between them. A spark-plug 5 set into 2b is wired to a 10,000 volt transformer.

Using the apparatus just described a continuous length of flexible polyester polyurethane foam 12 inches wide, that is, narrower than the platens, and one-fourth inch thick was reticulated as follows.

First, the platens 2a and 2b are moved apart, by actuation of the piston 1a, to their fully open position. The end of the sheet is then inserted from one side of the platens into the gap between them and pushed through until it emerges from the other side and the part of the sheet first to be reticulated lies between the platens (FIG. I). The piston 1a is pushed downwards by the pressure of compressed air in cylinder 1 thereby moving the platens towards each other and compressing the intervening foam to a small fraction of its former thickness. This compression results in substantially all the air being expelled from the cells of the foam by way of the edges of the sheet (FIG. II). The platens are then slowly opened to their full extent and while being opened a predetermined quantity of a combustible gaseous medium consisting of a mixture of two parts by volume of hydrogen and one part by volume of oxygen sufficient to fill the foam previously compressed is passed into the gas reservoirs by way of the non-return valve 7, and the gas inlets 6a and 6b. The gas then flows from the gas reservoirs through the perforations in the platen and into the expanding foam (FIG. III). The valve 7 is closed and the spark-plug 5 is energized thereby igniting the combustible gaseous medium which in burning thermally reticulates the foam between the platens (FIG. IV). The sheet is then moved forward between the fully opened platens so that the reticulated portion 8 is withdrawn from between the platens, (FIG. V), and the cycle of operations is repeated. continued indexing forward and repetition of the method steps described above results in the sheet being reticulated along its length.

Application of the method to the bonding together of thermoplastic strands follows a similar course to that described above with regard to reticulation.

In the above specific method the sparking plug was set in the middle of the lower platens. However, it should be noted that if the combustible gaseous medium is introduced into the sheet by the displacement procedure described above, where the inlet for the gas is preferably in the central zone of the platen, the spark-plug is conveniently located outside the central zone.

Where the method is used to reticulate a continuous sheet of polyurethane or other plastic foam the sheet can be conveniently obtained from a block or loaf of foam by means of the cutting machine known as the Baumer Loop machine (e.g. a type BSV-E or BSV-R), and such a machine is conveniently arranged in a series with apparatus such as that described above.

Having now described our invention what we claim is:

1. A method of reticulating a sheet of inter-communicating cellular thermoplastic material or of bonding together a sheet of a mass of strands of thermoplastic material into a coherent fibrous body, comprising constraining part of the sheet between two platens; filling the cells of the sheet in said part with a combustible gaseous medium; and igniting the gas, whereby sufficient heat is generated to reticulate the cellular material or fuse together the strands at their points of contact.

2. A method according to claim 1, in which after said part of the sheet has been treated, the sheet is advanced so that an adjacent untreated portion of the sheet comes between the platens, and the method of claim 1 is repeated.

3. A method according to claim 1, in which the combustible gaseous medium is introduced into the cells of said part of the sheet by expelling substantially all the air from the cells and then filling the cells with the combustible gaseous medium.

4. A method according to claim 1, in which the combustible gas is introduced into the cells of said part of the sheet by replacing part of the air in the cells with a gaseous fuel which mixes with the air remaining in said cells to form said combustible gaseous medium.

5. A method of bonding together a sheet of a mass of strands of thermoplastic material according to claim 1, in which the strands comprise a material selected from the group consisting of polypropylene, nylon, and polyethylene terephthalate.

6. A method according to claim 1, in which the combustible gaseous medium comprises a mixture of oxygen and a gas selected from the group consisting of hydrogen, coal gas, natural gas and propane.

7. A method according to claim 1, in which the combustible gaseous medium is a mixture comprising (a) oxygen and (b) coal gas, natural gas or propane.

8. A method according to claim 1, in which the combustible gaseous medium is non-reducing.

9. A method according to claim 1, in which the air in the sheet material is expelled from the cells by direct displacement with the combustible gaseous medium.

10. A method according to claim 9, in which the combustible gaseous medium is introduced into the sheet material in a central zone of the part of the sheet between the platens and allowed to spread through said part, thereby displacing the air outwardly to the edges of the sheet.

11. A method according to claim 1, in which the combustible gaseous medium is introduced into the sheet of the mass of strands by squeezing said part of the sheet to expel a substantial amount of air and then allowing said part to expand while in contact with a supply of the combustible gaseous medium.

12. A method according to claim 1, in which the cellular material is a polyether or polyester polyurethane.

13. A method according to claim 1, in which the combustible gaseous medium is introduced into the sheet of cellular material by squeezing said part of the sheet to expel a substantial amount of air and then allowing said part to expand while in contact with a supply of the combustible gaseous medium.

* * * * *